US009589096B1

(12) United States Patent
Gupta et al.

(10) Patent No.: US 9,589,096 B1
(45) Date of Patent: Mar. 7, 2017

(54) METHOD AND APPARATUS FOR INTEGRATING SPICE-BASED TIMING USING SIGN-OFF PATH-BASED ANALYSIS

(71) Applicant: Cadence Design Systems, Inc., San Jose, CA (US)

(72) Inventors: Umesh Gupta, Kurukshetra (IN); Vishnu Kumar, Gautam Budh Nagar (IN); Manish Bansal, Delhi (IN); Naresh Kumar, Gautam Budh Nagar (IN); Manuj Verma, Ghaziabad (IN); Prashant Sethia, Gautam Budh Nagar (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/716,059

(22) Filed: May 19, 2015

(51) Int. Cl.
*G06F 17/50* (2006.01)

(52) U.S. Cl.
CPC ...... *G06F 17/5081* (2013.01); *G06F 17/5036* (2013.01)

(58) Field of Classification Search
CPC .......................... G06F 17/5031; G06F 17/5081
USPC ............ 716/106, 108, 111, 113, 136; 703/16
See application file for complete search history.

(56) References Cited

U.S. PATENT DOCUMENTS

| 4,792,913 | A * | 12/1988 | Buckland | G06F 17/5009 703/14 |
| 6,581,197 | B1 * | 6/2003 | Foutz | G06F 17/5031 716/108 |
| 6,604,227 | B1 * | 8/2003 | Foltin | G06F 17/5031 716/104 |
| 6,609,233 | B1 * | 8/2003 | Foltin | G06F 17/5031 716/108 |
| 6,611,948 | B1 * | 8/2003 | Tyler | G06F 17/5031 716/113 |
| 6,996,515 | B1 * | 2/2006 | Foltin | G06F 17/5031 703/19 |
| 8,595,677 | B1 * | 11/2013 | Shu | G06F 17/5036 716/100 |
| 8,601,420 | B1 * | 12/2013 | Keller | G06F 17/5036 716/108 |
| 8,954,917 | B1 * | 2/2015 | Shu | G06F 17/5036 716/100 |
| 9,218,440 | B2 * | 12/2015 | Mulvaney | G06F 17/5031 |
| 2002/0188915 | A1 * | 12/2002 | Hayes | G06F 17/5036 716/113 |

(Continued)

FOREIGN PATENT DOCUMENTS

JP          07282097 A  * 10/1995

*Primary Examiner* — Phallaka Kik
(74) *Attorney, Agent, or Firm* — Andrews Kurth Kenyon LLP (57) ABSTRACT

Methods and systems provide setup and generation of SPICE results for a set of timing path(s) and integration of SPICE simulation with static timing analysis (STA) path-based results generation. In an embodiment, a method may select a candidate set of timing paths, perform path based analysis (PBA) on the selected paths, generate SPICE results for the selected paths, and render the PBA and SPICE results in an integrated user interface to facilitate sign off based on annotated constraints and correlation between STA results and SPICE results. Methods and systems of the present disclosure find application in, among other things, timing signoff in an electronic design and verification process.

20 Claims, 6 Drawing Sheets

(56) References Cited

U.S. PATENT DOCUMENTS

| | | | |
|---|---|---|---|
| 2006/0047494 A1* | 3/2006 | Tamura | G06F 17/5036 703/19 |
| 2006/0080627 A1* | 4/2006 | Murgai | G06F 17/5031 716/113 |
| 2008/0244488 A1* | 10/2008 | Okumura | G06F 17/5031 716/113 |
| 2009/0287462 A1* | 11/2009 | Yi | G06F 11/261 703/2 |
| 2015/0269297 A1* | 9/2015 | Tuan | G06F 17/5036 716/106 |
| 2015/0331981 A1* | 11/2015 | Mulvaney | G06F 17/5031 716/134 |

* cited by examiner

```
Path 3: MET Setup Check with Pin dff2/CP
Endpoint:   dff2/D (^) checked with leading edge of "CLK"
Beginpoint: dff1/Q (^) triggered by leading edge of "CLK"
Path Groups: {CLK}
Retime Analysis { Path-slew SPICE }  ← 708
Other End Arrival Time              2.320
- Setup                             0.200
+ Phase Shift                       5.000
= Required Time                     7.120
- Arrival Time                      2.619
= Slack Time                        4.501
= Slack Time (original)             4.501
    Clock Rise Edge                 0.000
  + Clock Network Latency (Prop)    1.471
  = Beginpoint Arrival Time         1.471
```

| Cell       | Edge | Retime Slew | SPICE Slew | Slew Error | Slew Error(%) | Retime Delay | SPICE Delay | Delay Error | Delay Error(%) | Arrival Time | SPICE Arrival |
|------------|------|-------------|------------|------------|---------------|--------------|-------------|-------------|----------------|--------------|---------------|
|            | ^    | 0.541       | 0.541      | 0.000      | 0.000         |              |             |             |                | 1.471        | 1.471         |
| SDFQD112T35| ^    | 0.151       | 0.152      | -0.001     | -0.919        | 0.315        | 0.301       | 0.014       | 4.624          | 1.786        | 1.772         |
| BUFQD012T35| ^    | 0.151       | 0.152      | -0.001     | -0.919        | 0.000        | 0.000       | 0.000       | 0.000          | 1.786        | 1.772         |
| BUFQD012T35| ^    | 1.426       | 1.429      | -0.003     | -0.203        | 0.833        | 0.832       | 0.001       | 0.108          | 2.619        | 2.604         |
| SDFQD112T35| ^    | 1.426       | 1.429      | -0.003     | -0.203        | 0.000        | 0.000       | 0.000       | 0.000          | 2.619        | 2.604         |
| ...        |      |             |            |            |               |              |             |             |                |              |               |

METHOD AND APPARATUS FOR INTEGRATING SPICE-BASED TIMING USING SIGN-OFF PATH-BASED ANALYSIS

FIELD OF THE DISCLOSURE

The present disclosure relates to methods and systems for electronic design and verification. More specifically, it relates to assessing timing of a circuit by generating a SPICE deck for a path being retimed during path-based analysis (PBA) useful for, among others things, signoff of timing verification.

BACKGROUND

Integrated circuit (IC) design may be facilitated with an electronic design automation (EDA) tool that receives a behavioral description of a circuit and outputs a structural description of the circuit. A designer may use the EDA tool to interactively position and connect various components on the circuit. The EDA tool then creates a circuit layout containing the physical locations and dimensions of the circuit's components, interconnections, and various layers from the original design. The structural description of the IC defines the fabrication of the IC. The designed IC is fabricated by transferring or printing the circuit layout to a semiconductor substrate in a series of layers that collectively will form the features that constitute the devices that make up the components of the IC.

After or during the design and creation of an IC layout, validation, optimization, and verification operations are performed on the IC layout using a set of testing, simulation, analysis and validation tools. These operations are conventionally performed in part to detect and correct placement, connectivity, and timing errors. For example, as part of the verification, the IC layout may undergo circuit simulation and analysis, which include testing signals between components. ICs have traditionally been characterized by the clock frequency at which they operate. Measuring the ability of a circuit to operate at a specified speed requires an ability to measure, during the design and verification processes, the delay of the circuit at various steps. One way to measure the delay is using static timing analysis (STA).

STA is a method of computing an expected timing of a digital circuit without requiring a lengthy and cost-prohibitive full simulation of the circuit. STA may be a feature of an EDA tool. STA may be used to determine whether clocks and signals are correctly timed. During STA, models of the expected timing of a digital circuit are created by estimating the expected delay within the circuit, for example, via an anticipated worst case signal path. The estimation of the expected delay may be based on graph-based analysis (GBA) or path-based analysis (PBA). GBA is more pessimistic than PBA because GBA takes a worst-case approach for slew propagation, wave forms, and derating. By contrast, PBA only propagates actual slews on the path and generally yields more accurate slew estimations.

An STA operator may be interested in the accuracy of the timing analysis between releases of a product designed and/or tested with a particular EDA timing tool. Users may also be interested in whether a timing violation may be ignored (i.e., whether a design may be signed off despite an outstanding violation), particularly at later stages of timing sign-off. These questions may be answered based on Simulation Program with Integrated Circuit Emphasis (SPICE) simulation, which is typically more accurate than STA. Indeed, conventional methods involve manual comparison, by a user, of a SPICE-generated result and an STA-generated result. However, this requires user expertise in both SPICE- and STA-style timing reports. Thus, there is a need in the art to facilitate examination of SPICE-based simulation results in an STA context.

BRIEF DESCRIPTION OF THE DRAWINGS

FIG. 7 is a timing report displayable on a user interface according to an embodiment.

DETAILED DESCRIPTION

There is a need in the art for accurate timing analysis, including for design, verification, and signoff. For example, if timing analysis is inaccurate, designers may overcompensate by designing circuits with lower than desired power, performance, and area (PPA) characteristics. SPICE may be used to provide more accurate timing analysis. However, SPICE can be costly to perform and difficult to use in conjunction with PBA analysis, especially for users who are unfamiliar with both tools.

Furthermore, users may be interested in: (i) accuracy of EDA-based timing tools, (i) a difference between versions of timing tools, e.g., performance variations, accuracy variations, and consistency between the versions, and (iii) during operation of the timing tool, whether a signoff may be made based on the timing analysis given an extent of pessimism built into the timing tool.

Figure 1:
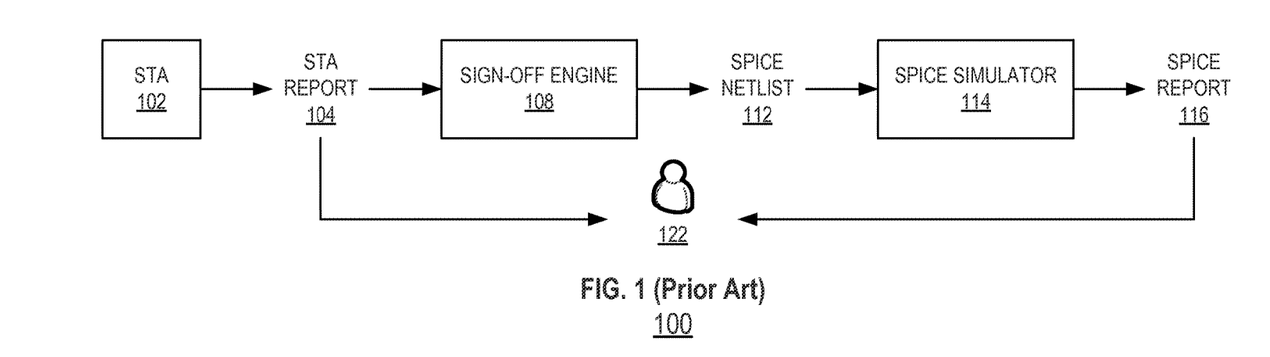
FIG. 1 is a block diagram of a system for performing timing analysis.

FIG. 1 is a block diagram of a system 100 for performing timing analysis. The system 100 may include a STA module 102, a sign-off engine 108, and a SPICE simulator 114. The STA module 102 may perform static timing analysis, including GBA and/or PBA, outputting an STA report. The sign-off engine 108 may be operated by a user 122 to approve circuit designs, based on, among other things, an STA report. The SPICE simulator 114 may perform simulations based on a received SPICE netlist 112 and may generate the results of its simulations as a SPICE report 116.

In operation, a comparison of timing paths may be made using SPICE-based simulation. Sign-off engine 108 may offer a built-in SPICE correlation capability for determining base delay and signal integrity (SI). The sign-off engine 108 may receive as input the STA report 104 of a given timing path, generate a SPICE netlist 112 for a series of path elements and invoke SPICE simulation on the SPICE netlist 112. The results, obtained as a SPICE report 116, may then be matched to the STA results 104. As shown, the matching of the SPICE report 116 and the STA report 104 is conventionally performed manually by a user 122. That is, a user may compare SPICE results and STA results to gain confidence in the STA results or to determine an accuracy of the STA results. However, system 100 requires users to have expertise in multiple reports and sources (i.e., STA and SPICE) for results comparison.

When a user compares a SPICE report with an STA report, the user may be interested in, among other things: (i) the effect of replacing SPICE simulation values with delay values reported by STA including reduction in path arrival time, (ii) a final slack time (also referred to as an "overall slack time") including consideration of arrival times, (iii) any SPICE simulation stages with significant variation compared with STA simulation including identification of particularities of the stage and inputs/outputs to the stage, (iv) an absolute value difference and/or percentage difference for those SPICE stages with significant variation (i.e., variation above a threshold) compared with STA variation, (v) a SPICE delay based arrival at intermediate stages including correlation with an STA result, (vi) a conditional arc used for delay calculation, and (vii) a correctness of minimum-maximum operating conditions (e.g., library cells). These questions trigger a manual cycle of verification in the signoff process. Thus, there exists a need to quickly answer these questions. Methods and systems of the present disclosure provide an integrated user interface that reports STA-based delays together with SPICE simulation based delays to answer, among other things, the questions outlined above.

Methods and systems of the present disclosure provide a framework to generate SPICE reports in a format compatible with typical STA reports so that a user unfamiliar with SPICE may perform timing analysis and sign-off. In an embodiment, timing paths are correlated in SPICE-based simulation and PBA analysis. An integrated user interface may also be provided to navigate aspects of the SPICE analysis. In contrast to conventional methods, which require a user to be able to use both SPICE and STA tools and to analyze reports generated by each tool, the methods and systems of the present disclosure initiate simulations and display corresponding metrics in a meaningful way to the user to facilitate comparison of SPICE results with STA results without requiring user expertise with SPICE and STA. For example, SPICE reports may be rendered with a similar (or same) look and feel as an STA report so that a user accustomed to interpreting STA reports may also comprehend the SPICE results. This allows a user unfamiliar with SPICE to perform SPICE-based STA at a large scale.

In an embodiment, a method is implemented by an electronic design and verification tool to generate a timing report for a circuit. The method may include performing PBA for each stage of the at least one signal path based on a netlist modeling the circuit. The method may include performing SPICE simulation for each stage of the at least one signal path based on a waveform at a start point of the at least one signal path. In contrast to conventional methods in which a SPICE simulation is based on a netlist output by STA, the method may perform SPICE simulation based on a waveform of a corresponding path start point. The method may include collecting at least one output from the PBA and at least one output from the SPICE simulation. The method may include correlating, stage-by-stage, the at least one PBA output with the at least one SPICE output. The method may generate the timing report on a stage-by-stage basis for the circuit based on the correlated output values. In contrast to conventional methods, the method may provide a timing report including output of PBA and SPICE simulation in an easy-to-interpret format by presenting outputs of each of the PBA and SPICE simulation for each stage. Also, the method may present outputs of each of the PBA and SPICE simulation for a corresponding stage side-by-side or near each other.

Figure 2:
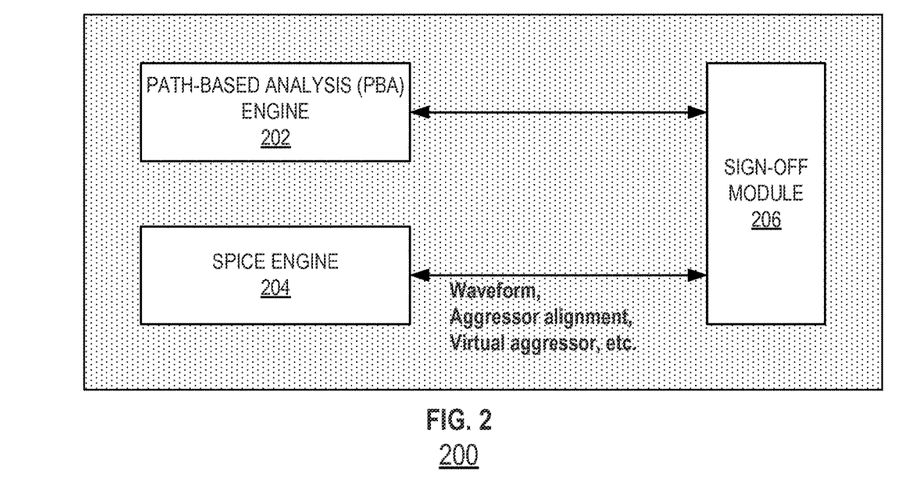
FIG. 2 is a simplified block diagram of a system for performing timing analysis according to an embodiment.

FIG. 2 is a simplified block diagram of a system 200 for performing timing analysis. The system 200 may include a PBA engine 202, a SPICE engine 204, and a sign-off module 206. In an embodiment, the system 200 may be part of a sign-off engine for performing timing sign-off in an electronic design and verification process.

The PBA engine 202 may perform timing analysis using PBA techniques. For example, the PBA may take a gate-level netlist as an input model and may output results of its analysis, e.g., as a set of timing reports. The timing reports may classify the circuit design represented by the input model into paths, i.e., subsections of the circuit, along with an indication of whether each path meets a pre-defined constraint. PBA may take as input a netlist and compute a worst arrival time and required time on nodes of an internal timing graph. PBA may compute a "worst slack" for nodes characterized as endpoints. PBA may target pessimism reduction, including slew merging, graph-based derating factors, and SI effects.

The SPICE engine 204 may be configured to receive a netlist and perform SPICE analysis of the components and paths represented by the netlist. By way of non-limiting example, SPICE analysis may include simulation and calculation of various delays on the paths represented by the netlist. Like PBA, SPICE may calculate a worst arrival time and worst slack for given endpoints. Compared with PBA, SPICE may be more accurate, but more expensive computationally.

The sign-off module 206 may handle a variety of timing derates, making simulations applicable for, among other things, instance- or design-based on-chip variation (OCV) and simultaneous switching input cells. The sign-off module 206 may handle waveform-based sign-off. The sign-off module 206 may receive a waveform available at a path startpoint. In an embodiment, the waveform is passed between the SPICE engine 204 and the sign-off module 206 via a flop clock (CK) pin using a handshake.

With respect to SPICE correlation for SI, in an embodiment, methods and systems may employ SPICE to generate a netlist for a single stage. This may reduce complexity by avoiding aligning of aggressor nets (also referred to as "aggressor") for a full path. An aggressor net may be a net that affects a victim net due to coupling with the victim net. In an alternative embodiment, a full path SI analysis is supported. The sign-off module 206 may facilitate SPICE correlation for stage-based SI analysis by aligning aggressors for a full path. The system 200 may include an interface to pass a list of filtered aggressors to the SPICE engine 204. For example, aggressor alignment available in the sign-off module 206 may be passed to the SPICE engine 204. The aggressor alignment may be passed between the sign-off module 206 and the SPICE engine 204 via a stage level handshake. In an embodiment, virtual aggressor data may be passed from the sign-off module 206 to the SPICE engine 204 via a stage level handshake.

The sign-off module 206 may synthesize minimum- and maximum-based side receiver sensitization and impact on launch and capture. The minimum- and maximum-based side receiver sensitization and impact may be communicated via a handshake between the sign-off module 206 and the SPICE engine 204.

The sign-off module 206 may perform SPICE correlation for paths including special cells such as macro or complex cells, including those cells that do not have a SPICE model and/or sub-circuit (also referred to as "subckt"). In an embodiment, the sign-off module 206 may use PBA delay for portions of the path corresponding to the special cells. For example, the PBA delay may be calculated by the PBA engine 202 and passed to the sign-off module 206.

In operation, the PBA engine 202 and the SPICE engine 204 may process inputs partly or completely in parallel to generate results more quickly in comparison with a pipelined architecture. For instance, the PBA engine 202 may receive input models such as a netlist defining the circuit for simulation, library models, parasitics, timing derates, input delays of gates and interconnects (e.g., standard delay format), system level constraints, etc. The SPICE engine 204 may receive input models such as a waveform for one or more path start points, or a netlist defining the circuit for simulation and information from the sign-off module 206 as described herein. The PBA engine 202 and the SPICE engine 204 may output, among other things, determined delay values and slew values to the sign-off module 206. In an embodiment, the PBA report generation infrastructure and SPICE deck generation and simulation framework are integrated such that a SPICE deck is generated partly or completely in parallel with respective PBA stages. This may improve the efficiency of the computer performing the PBA and SPICE simulation, e.g., by making more use of available computational resources within the computer and generating results more quickly than would a pipelined architecture. For instance, rather than waiting for PBA analysis of all stages of a circuit to be complete before passing a resulting netlist to the SPICE simulator, the SPICE simulator may take as input a waveform corresponding to the start point of a path for analysis and begin simulation before the PBA is complete. In an embodiment, a complete path SPICE deck simulation may overlap with STA path retiming. SPICE values may be generated on a full SPICE deck of a path being retimed before STA and SPICE values are processed and rendered so that various inputs provided to a stage delay calculator during PBA and SPICE deck generation are synchronized.

In an embodiment, the sign-off module 206 may use SPICE-generated data such as, among others, delay values and/or slew values, to recalculate summary parameters of a timing path. By way of non-limiting example, summary parameters include SPICE arrival time, SPICE arrival time in absolute terms, common path pessimism removal (CPPR) credit based on SPICE-based delays, and SPICE slack.

The sign-off module 206 may correlate the delay values received from the PBA engine 202 and the SPICE engine 204 and generate an integrated report including both PBA results and SPICE results. The report may be displayed on a user interface (UI). The report may be configurable via the UI. An example user interface is shown in FIG. 7. The system 200 may generate results that are more accurate and easier to use compared with conventional systems for timing sign-off.

Figure 3:
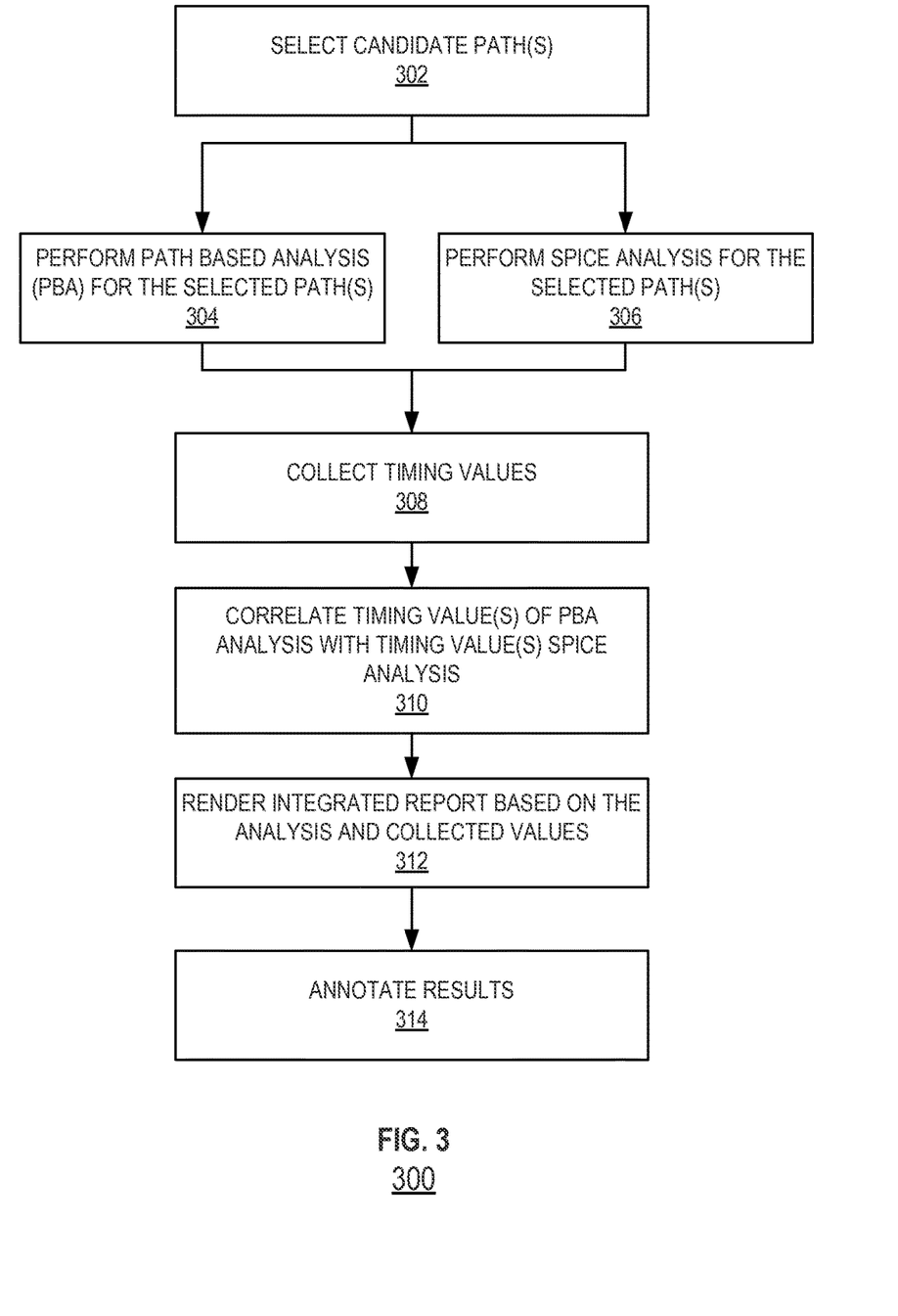
FIG. 3 is a flowchart of a method of performing timing analysis for an integrated circuit according to an embodiment.

FIG. 3 is a flowchart of a method 300 of performing timing analysis for an integrated circuit. In 302, the method 300 may select one or more candidate paths for which timing analysis is to be performed. In an embodiment, the one or more candidate paths may form an initial set of paths for analysis. The selected paths may include one or more critical endpoints or paths. A "critical" endpoint or path may be identified to be critical based on a variety of criteria, e.g., a propagation time exceeding a threshold value. In an embodiment, the method may re-time a set of paths of interest indicated by a user. In an embodiment, for constrained paths, selection criteria may be based on slack time. In an embodiment, for unconstrained paths, selection criteria may be based on arrival time. The method 300 may identify the initial set of paths based on GBA. In an embodiment, the method 300 may identify the initial set of paths based on method 400 shown in FIG. 4. In an embodiment, the candidate path selection may be performed by the sign-off module 206 shown in FIG. 2.

Returning to FIG. 3, in 304, the method 300 may perform PBA for the selected path(s). The PBA may include configuration of a PBA engine. By way of non-limiting example, the configuration may include: selection of an actual slew propagation mode; whether to perform SI; timing derates, simultaneous switching derates (SSI), advanced on-chip variation (AOCV); whether to be waveform-based; whether to perform full path or data path PBA; whether and where to focus on a section of a timing graph (e.g., a maximum number of paths, N worst options of report timing maximum slack, etc.); minimum or maximum analysis type, etc. In an embodiment, the PBA may be performed by the PBA engine 202 shown in FIG. 2.

Returning to FIG. 3, in 306, the method 300 may perform SPICE analysis for the selected path(s). The SPICE analysis may include setting up a SPICE deck generation and simulation interface. The method 300 may generate the SPICE deck automatically or systematically in response to processing of a corresponding PBA stage. In an embodiment, the SPICE deck generation and simulation interface includes at least one of: a load model, subckt details, base, and SI. The SPICE analysis may include running of report timing in SPICE deck generation and SPICE simulation enabled environment with configured settings. The configured settings may include at least one of: maximum paths, N worst paths, a retime mode, a maximum slack, a grouping or non-grouping mode, minimum or maximum analysis type, and the like. In an embodiment, the SPICE analysis may be performed by the SPICE engine 204 shown in FIG. 2. In embodiments, 306 may be performed at a different time from 304, or may be performed so as to overlap partly or completely with 304. In addition, in embodiments 304 may begin before 306, or 306 may begin before 304. The sequence is not critical.

Returning to FIG. 3, in 308, the method 300 may collect timing values. In an embodiment, the timing values may include a delay value and a slew value from each of the STA analysis and the SPICE simulation deck. In 310, the method 300 may correlate at least one timing value collected based on STA analysis with at least one timing value collected based on SPICE analysis. In an embodiment, the collection and/or correlation may be performed automatically or systematically by the sign-off module 206 shown in FIG. 2.

Returning to FIG. 3, in 312, the method 300 may render an integrated report based on at least some of the information collected in 308. The report may be displayed in a configurable, integrated user interface. An exemplary report is described herein, e.g., with respect to FIG. 7. Returning to FIG. 3, in 314, the method 300 may annotate results, for example in the integrated report. In an embodiment, the method 300 may determine and annotate a SPICE delay number for an intermediate node. In an embodiment, the method may determine and annotate a final path arrival (also referred to as an "overall path arrival") and/or final slack (also referred to as an "overall slack"). The method 300 may update the UI accordingly. In an embodiment, the method 300 may annotate the results based on method 500 shown in FIG. 5. In an embodiment, the rendering and annotating of the report may be performed by the sign-off module 206 shown in FIG. 2.

Figure 4:
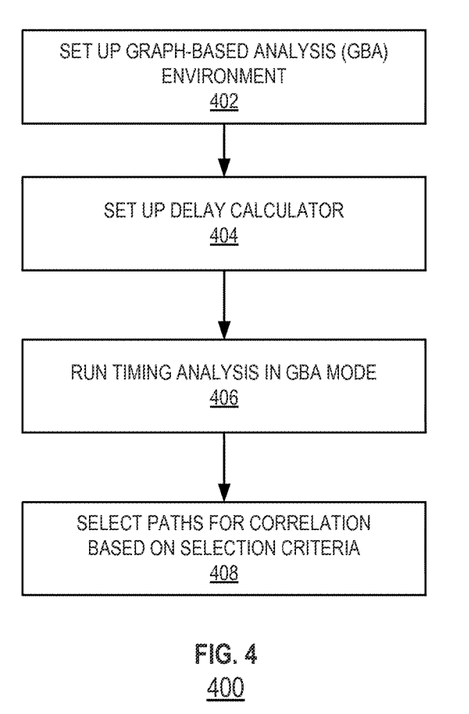
FIG. 4 is a flowchart of a method of identifying a candidate path for timing analysis of an integrated circuit according to an embodiment.

FIG. 4 is a flowchart of a method 400 of identifying a candidate path for timing analysis of an integrated circuit. In 402, the method 400 may configure a GBA environment. The method 400 may configure input models such as a netlist defining the circuit for simulation, library models, parasitics, timing derates, input delays of gates and interconnects (e.g., standard delay format), system level constraints, etc. In 404, the method 400 may configure a delay calculator based on the GBA environment set up in 402. The method 400 may then run timing analysis in GBA mode in 406. An example command is report_timing-max_paths ( )-nworst < >, which may cause a simulation on a maximum number of paths and a N worst number of endpoints. Based on the timing analysis, the method 400 may select one or more paths based on a selection criteria, which may be a basis for performing SPICE correlation in 408. By way of non-limiting example, a selection criteria may be a slack time exceeding a threshold, a begin-end pair, a setup time exceeding a threshold, a hold time exceeding a threshold, and an arrival time being exceeding a threshold. Selection criteria may include a violation or deviation from expected behavior. Selection criteria may be specified by a user. A path associated with a selection criteria may be identified as a candidate path for further timing analysis. In an embodiment, the further timing analysis is performed according to method 300 shown in FIG. 3. The method 400 may be performed by the sign-off module 206 shown in FIG. 2.

Figure 5:
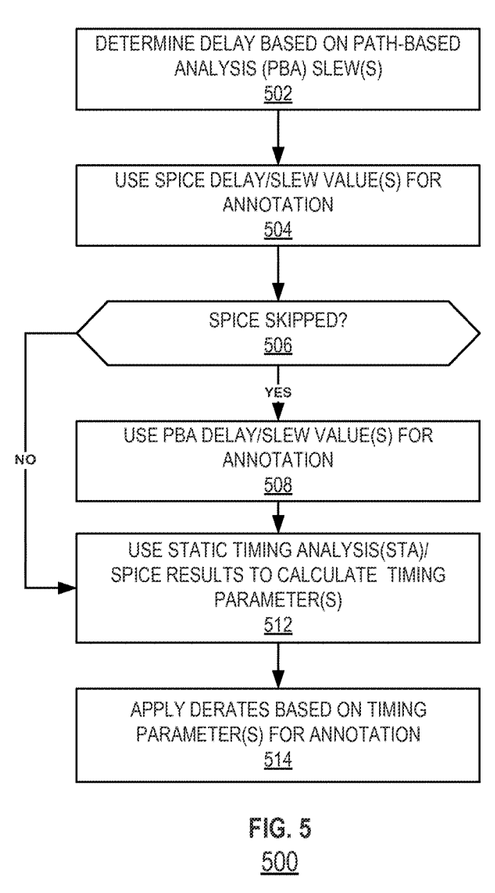
FIG. 5 is a flowchart of a method of annotating a result of timing analysis of an integrated circuit according to an embodiment.

FIG. 5 is a flowchart of a method 500 of annotating a result of timing analysis of an integrated circuit. In 502, the method 500 may determine a delay for a path based on a slew calculated according to PBA. In an embodiment, the delay may be calculated by the PBA engine 202 shown in FIG. 2. Returning to FIG. 5, in 504, the method 500 may use a SPICE delay and/or skew to annotate the result of the timing analysis. In an embodiment, the method 500 may annotate the delay and/or skew from a SPICE simulator for one or more stages included in a path. In 506, the method 500 may determine whether SPICE analysis has been skipped for a stage. For example, SPICE analysis may be skipped due to a special cell such as a macro cell or a complex cell for which a SPICE subckt is unavailable. If SPICE is skipped, the method 500 may proceed to 508 in which the method 500 uses a corresponding PBA delay or skew value. If SPICE is not skipped, the method 500 may proceed to 512. In 512, the method 500 may use STA and SPICE results to calculate at least one timing parameter. In 514, delays obtained from PBA and SPICE may be processed to apply derates. The derates may be specified by a user. The processed delays may be used for correlation. Timing parameters may include, among other things, an arrival time, a slack, and a CPPR, as further described herein, e.g., with respect to timing report 700. In an embodiment, the PBA delay and/or skew value(s) obtained in 508 and the STA and/or SPICE results obtained in 512 may be nominal delay values. A derate may be applied to these nominal delay values to obtain an overall or "final" delay value. In an embodiment, STA analysis in 512 may yield a delay value and an arrival time. Arrival time, CPPR, and a derated delay may be obtained as a result of 514.

Figure 6:
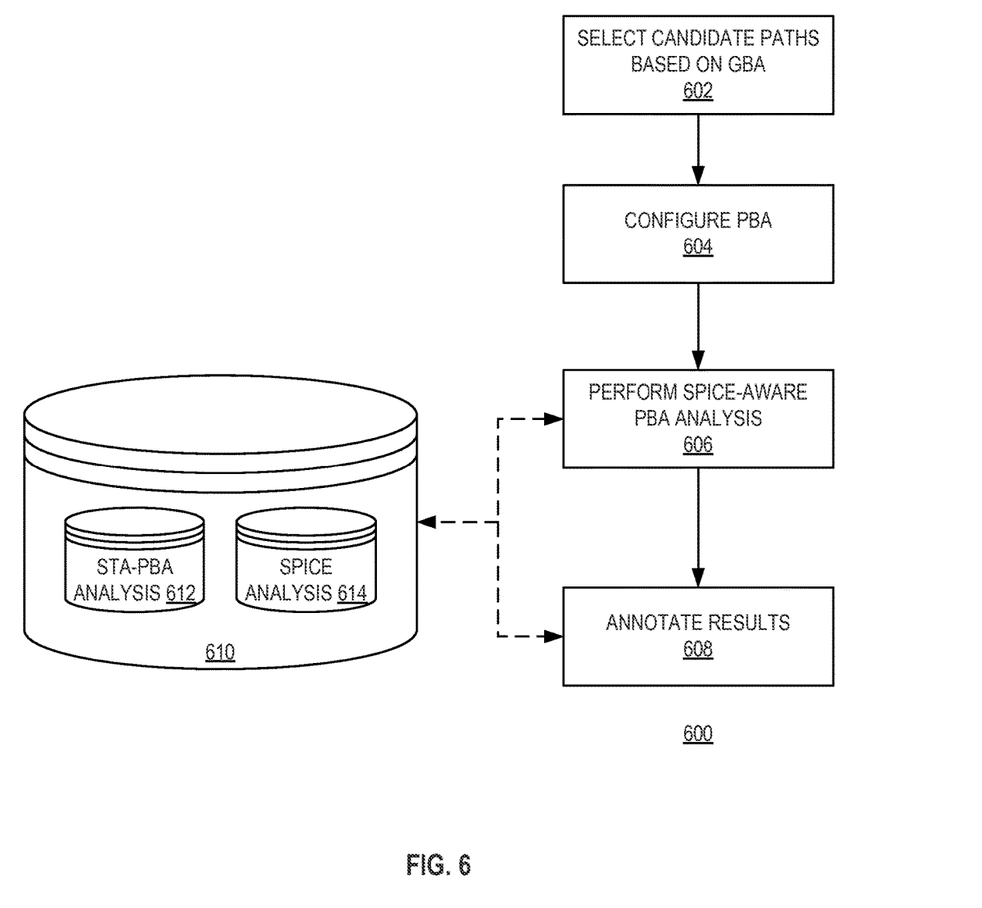
FIG. 6 is a diagram of a method and corresponding structure for performing timing analysis for an integrated circuit according to an embodiment.

FIG. 6 is a diagram of a method 600 and corresponding structure 610 for performing timing analysis for an integrated circuit. The structure 610 may be a storage apparatus 610, which may be accessed by method 600, for generating a SPICE-based report in an STA environment. The storage apparatus 610 may be implemented as a reporting database. The storage apparatus 610 may include and store STA-PBA results 312 and SPICE-based results 314. The storage apparatus 610 may be accessed by the method 600. For example, data may be read from and/or written to the storage apparatus in conjunction with method 600 as described herein.

In 602, the method 600 may select one or more candidate paths for which timing analysis is to be performed. In an embodiment, the one or more candidate paths may form an initial set of paths for analysis. The selected paths may include one or more critical endpoints or paths. A "critical" endpoint or path may be identified to be critical based on a variety of criteria, e.g., a propagation time exceeding a threshold value. In an embodiment, the method may re-time a set of paths of interest indicated by a user. In an embodiment, for constrained paths, selection criteria may be based on slack time. In an embodiment, for unconstrained paths, selection criteria may be based on arrival time. The method 600 may identify the initial set of paths based on GBA. In an embodiment, the method 600 may identify the initial set of paths based on method 400 shown in FIG. 4. In an embodiment, the candidate path selection may be performed by the sign-off module 206 shown in FIG. 2.

Returning to FIG. 6, in 604, the method 600 may configure PBA for the selected path(s). The configuration may include: selection of an actual slew propagation mode; whether to perform SI; timing derates, simultaneous switching derates (SSI), advanced on-chip variation (AOCV); whether to be waveform-based; whether to perform full path or data path PBA; whether and where to focus on a section of a timing graph (e.g., a maximum number of paths, N worst options of report timing maximum slack, etc.); minimum or maximum analysis type, etc. In an embodiment, the PBA may be performed by the PBA engine 202 shown in FIG. 2.

Returning to FIG. 6, in 606, the method 600 may perform SPICE analysis for the selected path(s). The SPICE analysis may include setting up a SPICE deck generation and simulation interface. The method 600 may generate the SPICE deck automatically or systematically in response to processing of a corresponding PBA stage. In an embodiment, the SPICE deck generation and simulation interface includes at least one of: a load model, subckt details, base, and SI. The SPICE analysis may include running of report timing in SPICE deck generation and SPICE simulation enabled environment with configured settings. The configured settings may include at least one of: maximum paths, N worst paths, a retime mode, a maximum slack, a grouping or non-grouping mode, minimum or maximum analysis type, and the like. In 606, the method 600 may access the storage apparatus 610 to determine a corresponding PBA stage. In an embodiment, the SPICE analysis may be performed by the SPICE engine 204 shown in FIG. 2.

Returning to FIG. 6, in 608, the method 600 may annotate results, for example in the integrated report. In an embodiment, the method 600 may determine and annotate a SPICE delay number for an intermediate node. In an embodiment, the method may determine and annotate a final path arrival (also referred to as an "overall path arrival") and/or final slack (also referred to as an "overall slack"). The method 600 may update the UI accordingly. In 608, the method 600 may access the storage apparatus 610 to retrieve results of STA-PBA analysis 612 and SPICE analysis 614 to annotate results. In an embodiment, the method 600 may annotate the results based on method 500 shown in FIG. 5.

FIG. 7 shows an exemplary report 700 of timing results. The report 700 may include delay values generated by PBA-based analysis and delay values generated by SPICE-based analysis. In an embodiment, the report 700 includes SPICE-based delay values in an STA report format. The report 700 may be displayed on a user interface, including a graphical user interface.

The report may indicate a path for which the timing analysis is performed. In an embodiment, the timing analysis is performed according to the methods and systems described herein, e.g., system 200. In the example of the report 700, the path is "Path 3: MET Setup Check with Pin dff2/CP." The report 700 may indicate that the timing analysis was performed with both PBA and SPICE. For instance, this is shown in the report 700 as "Retime Analysis {Path-Slew SPICE}." A delay, slew, and/or arrival for each stage may be displayed in the report 700. The values for the delay, slew, and/or arrival may be associated with each stage by annotating results on the timing path while the SPICE analysis and PBA analysis are performed. The stage-by-stage reporting is useful for identifying a source of a difference between SPICE results and PBA results in individual stages. For instance, the report displays slew values and delay values under respective headings so that a user can quickly identify those values that deviate from expected values. Other inputs can be reported through "report timing" columns so that all stage inputs to SPICE analysis may be available and reported.

The report 700 may include a column identifying a characteristic associated with the cells listed in each row. The characteristics displayed in the report 700 may include results of PBA analysis including "Retime Slew," "Retime Delay," and "Arrival Time." Retime slew (also known as "PBA slew") may be a slew propagated on a pin in PBA mode. The slew may be propagated along a particular path. If there are multiple incoming sources for a pin, the slew propagation may be calculated along the source present in the path. The retime slew is typically less pessimistic compared with GBA slew. The retime delay may be a retimed delay of a delay element determined based on PBA-based slew propagation. The arrival time may be an arrival at a particular pin propagated with PBA-based delays. The arrival time is typically less pessimistic than GBA-based arrival. The report may also display characteristics generated based on analysis of each of the retime slew, the retime delay, and the arrival time. For example, the report may display an arrival error or deviation from an expected arrival time. The report may indicate that the report is generated at least in part based on a PBA-SPICE analysis. For example, the report may include a tag 708 indicating that the report is generated in a PBA-SPICE mode.

The characteristics displayed in the report 700 may include results of SPICE analysis such as a set of delay characteristics 704 including "SPICE Delay," SPICE delay error in absolute terms ("Delay Error"), and SPICE delay error in percentage ("Delay Error (%)"). SPICE delay may be a delay calculated based on SPICE simulation. Delay error may be a difference (absolute or percentage value) between a retime delay and a SPICE delay.

The characteristics displayed in the report 700 may include results of SPICE analysis such as a set of slew characteristics 702 including "SPICE Slew," SPICE slew error in absolute terms ("Slew Error"), and SPICE slew error in percentage ("Slew Error (%)"). The SPICE slew may be a slew propagated during SPICE-based simulation. The SPICE slew may be propagated along a particular path. If there are multiple incoming sources for a pin, the slew propagation may be calculated along the source present in the path. Slew error may be a difference (absolute or percentage value) between a retime slew and a SPICE slew.

The characteristics displayed in the report 700 may include an arrival time determined based on SPICE analysis ("SPICE Arrival" 706). The SPICE arrival 706 may be an arrival at a particular pin propagated with SPICE-based delays.

The report may be configurable and may display additional information or information in a different format. These characteristics allow for a comparison between results of PBA analysis and results of SPICE analysis. For example, the PBA-based "Arrival Time" may be displayed near a SPICE-based "Spice Arrival" allowing for a comparison between the arrival times calculated by the different methods. This is useful for determining an accuracy and/or trustworthiness of the PBA results. In contrast to typical methods, these characteristics are automatically or systematically generated and integrated into the user interface.

The methods and systems described herein have particular utility in electronic design and verification automation in conjunction with the features of integrated STA and SPICE analysis. While the description here pertains to integration of SPICE analysis with STA reporting, the concepts described here apply as well to other applications, such as integration of other types of circuit simulations with STA reporting in the context of electronic design and verification automation. For instance, other types of circuit simulations may be performed in parallel with SPICE analysis and benefit from improved computer operating efficiency.

Figure 8:
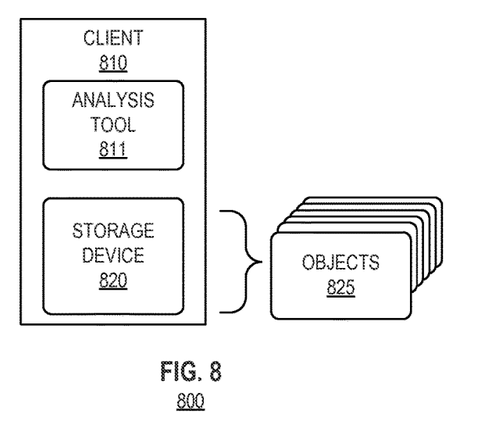
FIG. 8 is a simplified block diagram of a system according to an embodiment.

FIG. 8 is a simplified block diagram of a system implementing the methods and systems described herein. As shown in FIG. 8, a system 800 may include a client 810 executing an analysis tool 811 and having a storage apparatus 820. The analysis tool 811 may be configured to perform the methods described herein. The client 810 may be any computing system that executes an analysis tool 811 or otherwise facilitates access to storage 820, for example a personal computer. The client 810 may include a processor that performs a method in accordance with the disclosed embodiments. Such a client may be a tool environment or may be part of an overall test system in accordance with the disclosed embodiments. In an embodiment (not shown), more than one system, for example more than one instance of client 810, can be used to carry out the embodiments of the present disclosure. The more than one instance of client 810 may or may not communicate with each other.

Hardware models, instruction sets, software packages, timing files, netlists and other objects 825 used by the analysis tool 811 may be stored in storage 820. A user may access the objects 825 stored in storage 820 with the client 810 via the analysis tool 811, where the analysis tool 811 is capable of accessing storage apparatus 820 and displaying the objects 825 and the data associated with the objects. The analysis tool 811 may include a user interface, for example a program, application or middleware that acts as a front end to and facilitates access to objects in storage 820. The analysis tool 811 may facilitate one-to-one correspondence definition using the tools and procedures described herein. The user may interact with the analysis tool 811 through a number of input devices, such as by inputting a selection as with a mouse or inputting a request as with a keyboard. The user may observe the analysis results on an output device or display. The analysis tool 811 may run in an application window controlled by the user. As shown in FIG. 8, a client 810 may be a stand-alone system, as may be of particular interest where the components being analyzed and tested are highly confidential.

Figure 9:
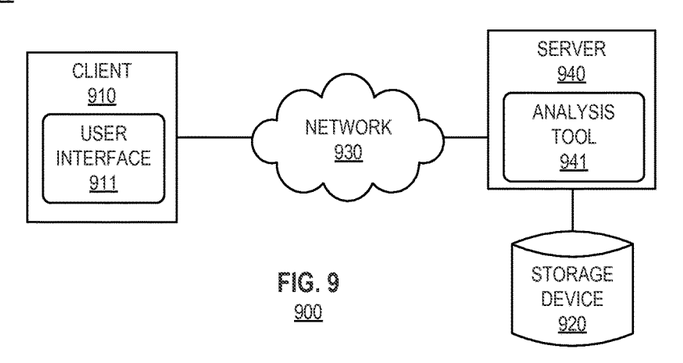
FIG. 9 is a simplified block diagram of a system according to an embodiment.

FIG. 9 is a simple block diagram illustrating components of an exemplary system 900 according to an embodiment. As shown in FIG. 9, system 900 may include a client 910 having a user interface 911. The client 910 may be connected to a server 940 via a network 930. The analysis tool 941, which in this embodiment is located at server 940, may have access to storage device 920 storing hardware models, instruction sets, software packages, timing files, netlists and other objects utilized by the analysis tool 941. The storage device 920 may be a stand-alone storage system, or may be part of server 940. The server 940 may include a processor that performs a method in accordance with the disclosed embodiments. Such a server then would be part of an overall test system in accordance with the disclosed embodiments.

A user may access an analysis tool 941 at the server 940 via the client 910 having a user interface 911 capable of accessing and displaying the design and the results of the one-to-one correspondence definition. The client 910 may be any computing system that facilitates the user accessing storage device 920, for example a personal computer. The network 930 may be a wired or wireless network that may include a local area network (LAN), a wireless network, the Internet, or any other network available for accessing the analysis tool 941 and storage device 920 from the client 910.

The server 940 may be a network server accessible to the client 910 via the network 930 that may manage access to storage device 920. The user interface 911 may receive instructions regarding testing a design from the user and utilizing the objects stored in memory storage 920, facilitate a display of the analysis or the information gathered during the analysis. Multiple different clients (not shown) may access storage device 920 via the network 930 and request access to the objects stored therein. In another networked environment, the analysis tool may be executed on a network capable client and access the models, packages and other objects stored in one or more storage devices via a network and communications server. As shown in FIG. 9, a client 910 may be a stand-alone system, as may be of particular interest where the components being simulated are highly confidential. Alternatively, client 910 may be part of a networked environment. As with the embodiment of FIG. 8, in an embodiment (not shown), more than one system, for example more than one instance of client 910 and/or server 940, can be used to carry out the embodiments of the present disclosure.

Figure 10:
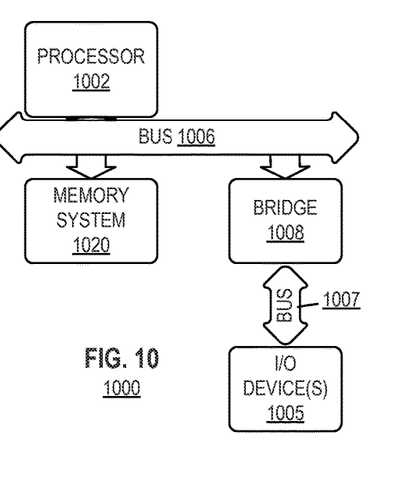
FIG. 10 is a simplified block diagram of a device according to an embodiment.

FIG. 10 is a simplified block diagram of a device 1000 implementing the methods and systems described herein. As shown in FIG. 10, the device 1000 may include a processor 1002, a memory system 1020, and at least one input/output (I/O) device 1005. The processor may be implemented according to the methods and systems described herein. For example, the processor may be configured to perform the steps of methods 300, 400, 500, and 600 shown in FIGS. 3, 4, 5, and 6.

The processor 1002, memory system 1020, and I/O device (s) 1005 may be communicatively coupled to each other. The communication may be implemented in a variety of ways, e.g., via at least one computer bus 1006 and/or bridge device 1008. The I/O device(s) 705 may include network adapters and/or mass storage devices from which the device 1000 may receive commands for executing the methods described herein. The I/O device(s) 1005 may be implemented according to the methods and systems described herein. For example, the I/O device(s) may receive input from a user, e.g., a matching command.

Although the foregoing description includes several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

As used in the appended claims, the term "computer-readable medium" may include a single medium or multiple media, such as a centralized or distributed database, and/or associated caches and servers that store one or more sets of instructions. The term shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

The present specification describes components and functions that may be implemented in particular embodiments which may operate in accordance with one or more particular standards and protocols. However, the disclosure is not limited to such standards and protocols. Such standards periodically may be superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

For example, operation of the disclosed embodiments has been described in the context of servers and terminals that implement analysis tools in EDA applications. These systems can be embodied in electronic devices or integrated circuits, such as application specific integrated circuits, field programmable gate arrays and/or digital signal processors. Alternatively, they can be embodied in computer programs that execute on personal computers, notebook computers, tablets, smartphones or computer servers. Such computer programs typically are stored in physical storage media such as electronic-, magnetic- and/or optically-based storage devices, where they may be read to a processor, under control of an operating system and executed. And, of course, these components may be provided as hybrid systems that distribute functionality across dedicated hardware components and programmed general-purpose processors, as desired.

In addition, in the foregoing Detailed Description, various features may be grouped or described together the purpose of streamlining the disclosure. This disclosure is not to be interpreted as reflecting an intention that all such features are required to provide an operable embodiment, nor that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

Also, where certain claims recite methods, sequence of recitation of a particular method in a claim does not require that that sequence is essential to an operable claim. Rather, particular method elements or steps could be executed in different orders without departing from the scope or spirit of the invention.

What is claimed is:

1. A method implemented by an electronic design and verification tool to generate a timing report for a circuit, the circuit having at least one signal path, the at least one signal path having at least one stage, the method implemented by one or more processors and comprising:
    performing path-based analysis (PBA) for each stage of the at least one signal path based on a netlist modeling the circuit;
    performing SPICE simulation for each stage of the at least one signal path based on a waveform at a start point of the at least one signal path, wherein the SPICE simulation is performed at least partly in parallel with the PBA for each stage;
    collecting at least one output from the PBA and at least one output from the SPICE simulation;
    correlating, stage-by-stage, the at least one PBA output with the at least one SPICE output; and
    generating the timing report on a stage-by-stage basis for the circuit based on the correlated output values.

2. The method of claim 1, wherein the SPICE simulation is performed based on a received aggressor alignment for a respective stage.

3. The method of claim 1, further comprising selecting the at least one signal path for the PBA and the SPICE simulation based on a signal propagation time of the at least one signal path exceeding a first threshold.

4. The method of claim 3, wherein the signal propagation time is determined based on graph-based analysis (GBA).

5. The method of claim 3, wherein the selecting the at least one signal path includes:
    configuring a graph-based analysis (GBA) environment using at least one of: a netlist and a timing model;
    performing GBA of the at least one signal path; and
    selecting the at least one signal path of the circuit based on at least one of: a slack time, a setup time, a hold time, and an arrival time, exceeding a second threshold.

6. The method of claim 1, wherein the performing the SPICE simulation for a respective stage is in response to the performing PBA for the respective stage.

7. The method of claim 1, wherein the collected at least one SPICE output includes at least one of: a delay and a slew.

8. The method of claim 1, further comprising annotating the timing report, the annotating including determining a SPICE delay value for an intermediate node.

9. The method of claim 8, wherein the annotating further includes determining at least one of: an overall arrival time and an overall slack time, for the at least one signal path.

10. The method of claim 8, wherein the annotating further includes:
    annotating the timing report with a delay of the at least one signal path based on at least one PBA slew;
    annotating the timing report with at least one of: a SPICE delay and a SPICE slew for the at least one signal path;
    responsive to a determination that SPICE simulation is unavailable for a cell, annotating the cell with a corresponding PBA value for the cell.

11. The method of claim 8, wherein the annotating further includes:
    annotating the timing report with a delay of the at least one signal path based on at least one PBA slew;
    responsive to a determination that a pre-defined cell delay value is available for overriding a SPICE delay, annotating the timing report with the pre-defined cell delay value for the at least one signal path.

12. The method of claim 8, wherein the electronic design and verification tool includes a sign-off functionality and the timing report includes a recommendation for whether to sign-off based on the annotating.

13. The method of claim 1, wherein the timing report includes at least one of a delay error, a slew error, an arrival time, and an arrival error, each determined based on the SPICE simulation.

14. The method of claim 1, wherein the timing report presents side-by-side the at least one PBA timing value and the at least one SPICE timing value for a respective stage.

15. The method of claim 14, further comprising rendering a configurable version of the timing report on a user interface.

16. An electronic design and verification system for generating a timing report for a circuit having at least one signal path, the at least one signal path having at least one stage, the system comprising:
    a storage apparatus to store the at least one signal path; and
    a processor executing instructions so as to configure the processor to include:
        a path based analysis (PBA) engine to perform PBA for each stage of the at least one signal path based on a netlist modeling the circuit;
        a SPICE engine to perform SPICE simulation for each stage of the at least one signal path based on a waveform at a start point of the at least one signal path, wherein the SPICE simulation is performed at least partly in parallel with the PBA for each stage; and
        a sign-off module to:
            collect at least one output from the PBA and at least one output from the SPICE simulation;

correlate, stage-by-stage, the at least one PBA output with the at least one SPICE output; and generate the timing report on a stage-by-stage basis for the circuit based on the correlated output values.

17. The electronic design and verification system of claim 16, wherein the processor further executes instructions to as to configure the processor to include a graph-based analysis (GBA) engine to:

configure an environment using at least one of: a netlist and a timing model;

perform GBA of the at least one signal path; and select the at least one signal path of the circuit based on at least one of: a slack time, a setup time, a hold time, and an arrival time, exceeding a second threshold.

18. The electronic design and verification system of claim 16, wherein the sign-off module additionally:

annotates the timing report with a delay of the at least one signal path based on at least one PBA slew;

annotates the timing report with at least one of: a SPICE delay and a SPICE slew for the at least one signal path; and responsive to a determination that SPICE simulation is unavailable for a cell, annotates the cell with a corresponding PBA value for the cell.

19. The electronic design and verification system of claim 16, wherein the timing report includes at least one of a delay error, a slew error, an arrival time, and an arrival time error, each determined based on the SPICE simulation.

20. A non-transitory computer-readable medium storing program instructions that, when executed, cause a an electronic design and verification tool to perform a method to generate a timing report for a circuit having at least one signal path, the at least one signal path having at least one stage, the method comprising:

performing path-based analysis (PBA) for each stage of the at least one signal path based on a netlist modeling the circuit;

performing SPICE simulation for each stage of the at least one signal path based on a waveform at a start point of the at least one signal path, wherein the SPICE simulation is performed at least partly in parallel with the PBA for each stage;

collecting at least one output from the PBA and at least one output from the SPICE simulation;

correlating, stage-by-stage, the at least one PBA output with the at least one SPICE output; and generating the timing report on a stage-by-stage basis for the circuit based on the correlated output values.

* * * * *

UNITED STATES PATENT AND TRADEMARK OFFICE
CERTIFICATE OF CORRECTION

PATENT NO. : 9,589,096 B1
APPLICATION NO. : 14/716059
DATED : March 7, 2017
INVENTOR(S) : Umesh Gupta et al.

It is certified that error appears in the above-identified patent and that said Letters Patent is hereby corrected as shown below:

In the Claims

Column 15, Line 7, change "instructions to as" to --instructions so as--;

Column 16, Line 6, change "cause a an electronic" to --cause an electronic--.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*